June 5, 1951  A. J. MERCIER ET AL  2,555,984
DISPENSING DEVICE
Filed Dec. 26, 1947  3 Sheets-Sheet 1
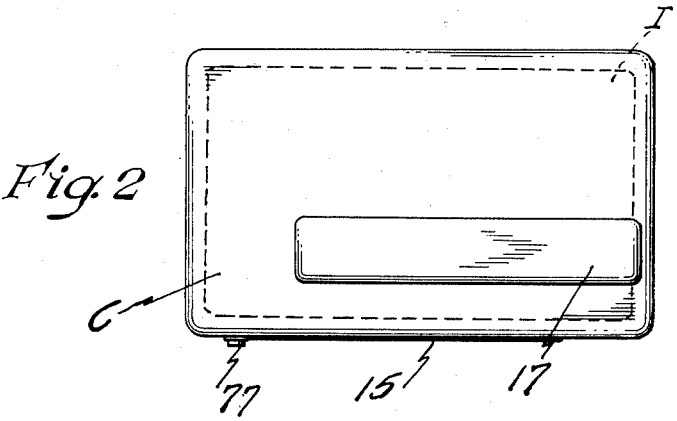
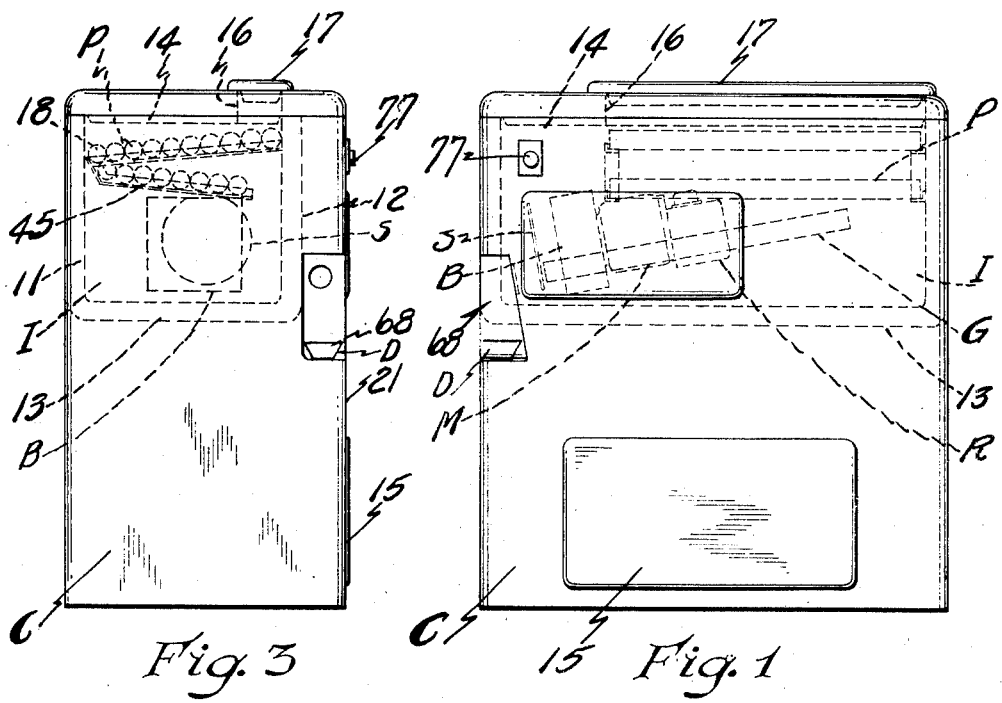
Inventors
Armond J. Mercier
Donald C. Lawless
BY
Frank C. Karman
ATTORNEY

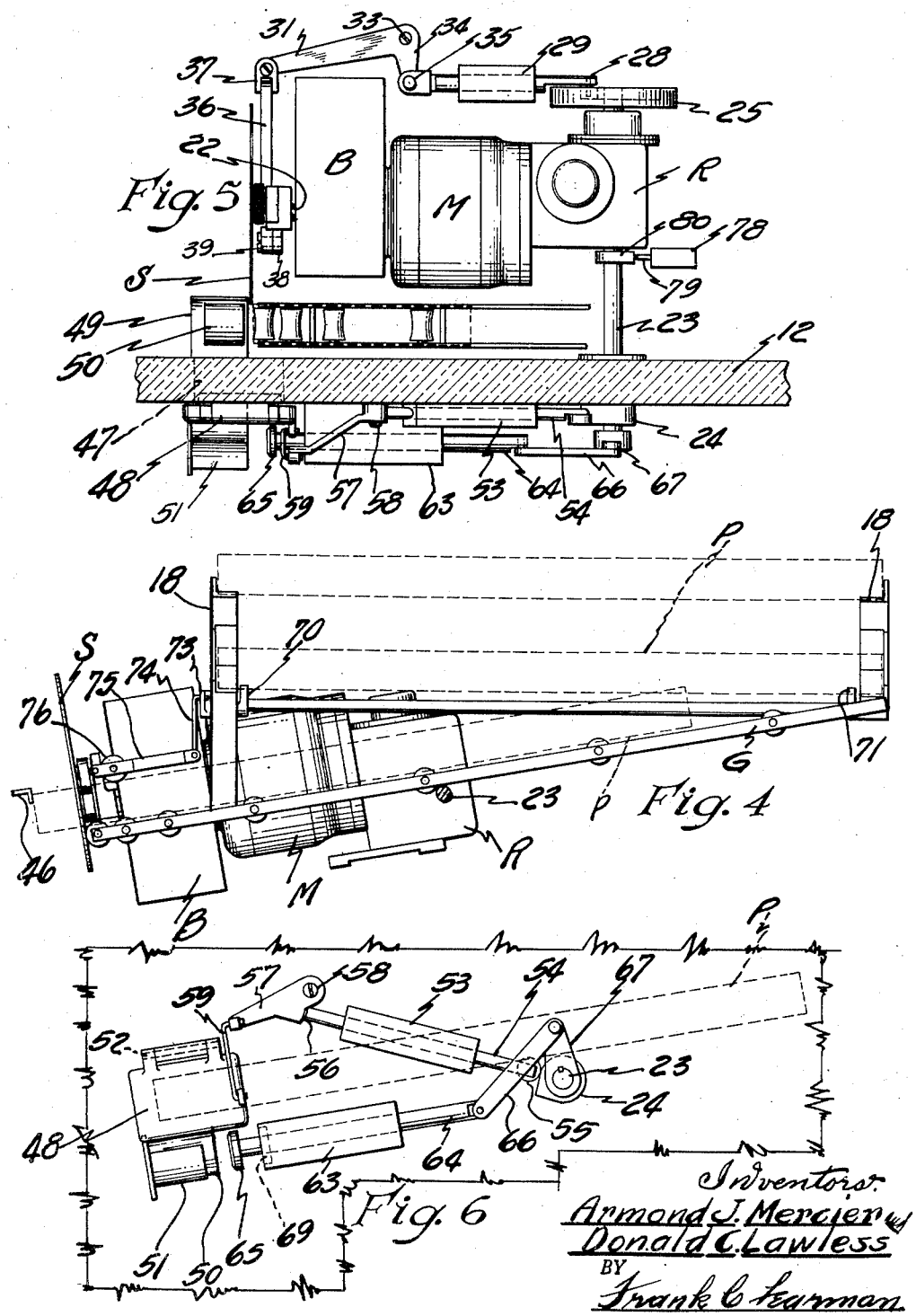

June 5, 1951 A. J. MERCIER ET AL 2,555,984
DISPENSING DEVICE
Filed Dec. 26, 1947 3 Sheets-Sheet 3
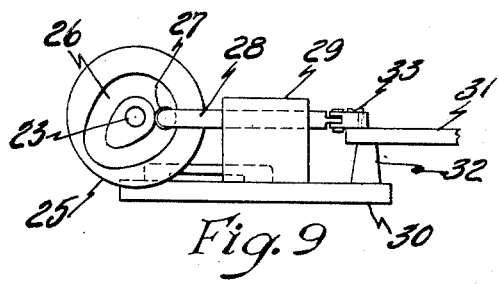
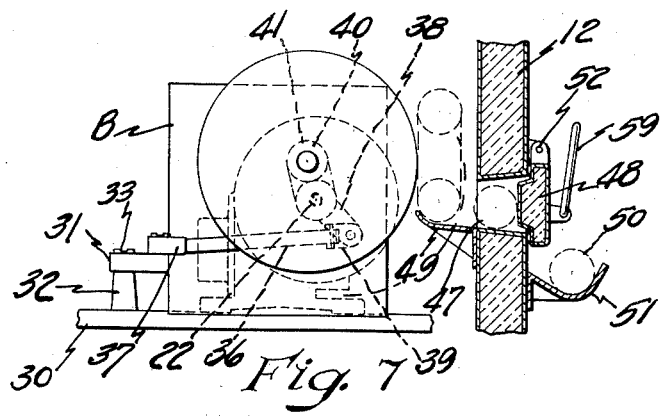
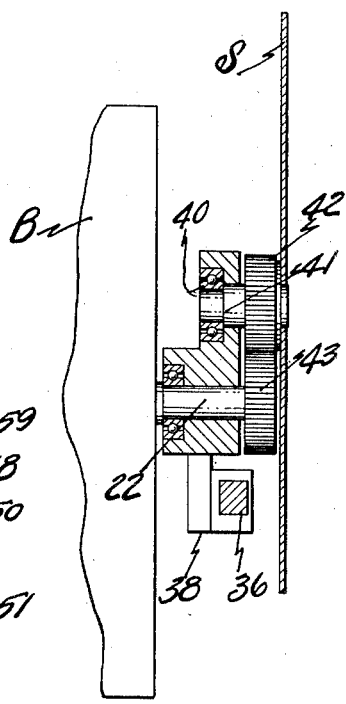
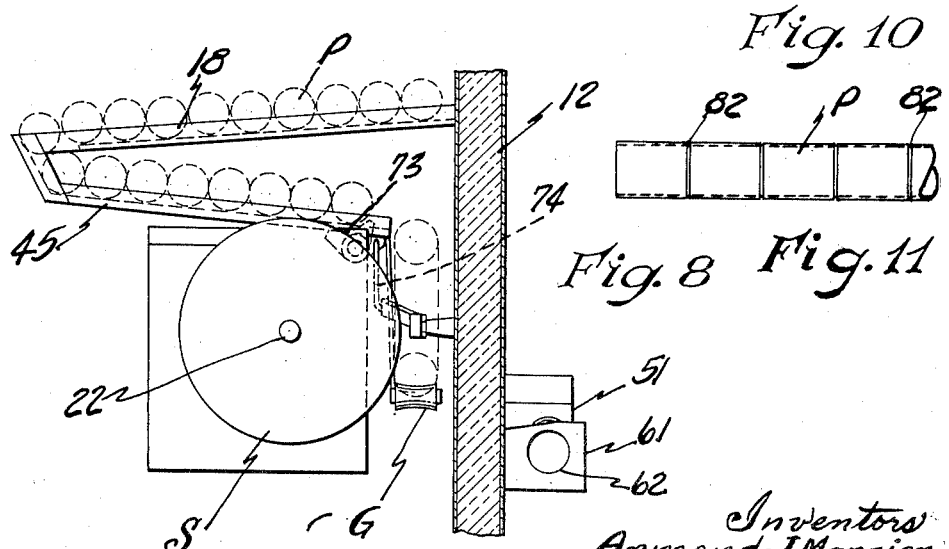
Inventors
Armond J. Mercier
Donald C. Lawless
BY Frank C. Barman
ATTORNEY Patented June 5, 1951

2,555,984

UNITED STATES PATENT OFFICE 2,555,984

DISPENSING DEVICE

Armond J. Mercier, Essexville, Mich., and
Donald C. Lawless, Vermilion, Ohio

Application December 26, 1947, Serial No. 793,830

15 Claims. (Cl. 107—21)

This invention relates to dispensing devices for automatically dispensing ice cream and similar edibles, and more particularly to a machine for cutting tubes of packaged ice cream of predetermined length into accurately measured sections each time the device is operated.

One of the prime objects of the invention is to provide a refrigerated dispensing cabinet in which tubes of ice cream are placed, and provide mechanism for successively cutting, positioning, and extruding the ice cream from the individual tube sections into a dish or other receptacle.

Another object is to provide a dispensing machine of simple, practical, and economical design, which can be connected to a light socket or other outlet, and which has storage capacity for a large number of tubes filled with ice cream, so the machine can be operated to dispense a large number of servings before refill becomes necessary.

A further object is to provide a dispensing machine provided with a refrigerated chamber in which a large number of ice cream tubes can be stored, insuring the ice cream being of uniform hardness, and provide means for cutting each tube into sections of uniform, predetermined length, extruding the ice cream from the individual sections, and eliminating the messy, sloppy, method of serving ice cream which is of varying degrees of hardness.

Still a further object is to provide a dispensing machine which eliminates all waste, so that the entire volume of ice cream is accurately measured and served, which eliminates the tedious and wasteful hand dispensing as practiced at the present time, and which is highly sanitary in operation.

A further object still is to provide a dispensing machine provided with a refrigerated chamber having a discharge opening and door therein, and provide means for automatically opening and closing said door in proper sequence, as each section of packaged ice cream discharges into said opening.

A further object is to provide racks in the refrigerated chamber, together with stop means for automatically feeding the individual filled tubes to the cutting means in proper sequence, as the machine is operated.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a side-elevational view of our dispensing apparatus.

Fig. 2 is a top, plan view thereof.

Fig. 3 is a front-elevational view.

Fig. 4 is an enlarged, side-elevational view of the storage rack, motor cutting element and associated mechanism located inside the refrigerated area, the packaged tubes of ice cream being indicated in broken lines.

Fig. 5 is a plan view of the unit with the storage rack omitted, and showing one wall of the refrigerating chamber.

Fig. 6 is also a side-elevational view illustrating the door control and extruding mechanism located outside the refrigerated area, the tube of ice cream being shown in broken lines.

Fig. 7 is a fragmentary, sectional, end-elevational view showing the cutting element, actuating mechanism, and one wall of the refrigerating chamber, the tube of ice cream and a cut off section being shown in broken lines.

Fig. 8 is a view similar to Fig. 7 showing the saw, motor, and storage racks, the tubes of ice cream being shown in broken lines.

Fig. 9 is a fragmentary, side-elevational view, opposite to that shown in Figs. 4 and 6 of the drawings, showing the cam and mechanism for actuating the cut-off saw.

Fig. 10 is an enlarged, part-sectional view showing the cut-off saw, gearing and magnetic brake.

Fig. 11 is an enlarged, side-elevational view showing the scoring of the cartons.

The instant application is directed to ice cream vending machines in which tubes of predetermined length are filled with an ice cream solution, and then frozen, these filled tubes being placed in storage racks in a refrigerated compartment, and will be hereinafter referred to as packaged ice cream tubes, these tubes being cut to certain lengths to provide individual servings, and while in the present instance I have shown these as cylindrical in shape, they can, of course, be of any other desired shape.

Referring now more specifically to the drawings in which we have shown the preferred embodiment of our invention, the letter "C" indicates a cabinet which is preferably enameled and/or porcelain coated so that it forms an attractive apparatus or piece of furniture in a business establishment.

This cabinet "C" is preferably rectangular in shape, and walls 11, 12, 13 and 14 form an insulated chamber "I" in which the packaged ice cream "P" or other frozen edible is stored, the lower section of the cabinet being utilized to provide space for mounting a motor and compressor (not shown) so that the upper refrigerated chamber may be maintained at proper temperature.

A door 15 opens into the side wall of the cabinet to facilitate mounting the mechanism and providing access thereto when desired, and an opening 16 is provided in the top wall of the cabinet and chamber, a hinged cover 17 forming a closure therefor.

The opening 16 is of suitable size to permit loading and storage of tubes of ice cream "P," these tubes being of predetermined size and length, and an inclined rack 18 is mounted in the chamber "I," each tube rolling, by gravity, to a gravity conveyor "G" where it is cut into individual servings and in a manner to be presently described.

The front wall 12 of the refrigerated chamber "I" is spaced from the front wall 21 of the cabinet, and a motor "M" is mounted on a bracket (not shown) in said chamber, said motor being equipped with a magnetic brake "B," and a reducer "R" is drivingly connected to one end of the motor shaft 22.

A transversely disposed shaft 23 is mounted in the speed reducer "R," one end of said shaft projecting through the wall 12 of the chamber "I," and a door control cam 24 is mounted thereon for operation of the door in proper sequence as the machine is operated.

A face cam 25 is mounted on the opposite end of the shaft 23 and is grooved as at 26 to accommodate a follower 27 which is mounted on the link 28, said link being slidably mounted in a bearing 29 provided on the bracket 30. An angularly shaped arm 31 is pivotally mounted on the boss 32 at the point 33, the leg 34 being connected to the link 28 at the point 35, the opposite leg being connected to a link 36 by means of a swivel joint 37 as clearly shown in Figs. 5 and 7 of the drawings, the opposite end of the link being connected to the crank 38 by means of another swivel joint 39.

The crank 38 is journaled on the motor shaft 22 and includes an offset bearing 40 in which the shaft 41 of a gear 42 is mounted, the cut-off saw "S" being mounted on said gear and a similar gear 43 is mounted on the motor shaft, meshing with and driving the gear 42 on which the cut-off saw is mounted, and it will be obvious that as the motor "M" is energized, the saw will be driven and the cam 25 will be actuated to swing the driven saw "S" through an arc of approximately 130 degrees and thus perform the cut off operation.

The storage rack 18 is designed to provide ample storage space for the tubes of ice cream, the upper inclined rack 18 leading to another return flight 45, and a gravity conveyor "G" is provided between the end of the flight 45 and the wall 12 of the refrigerated chamber, the lower end of said conveyor terminating directly adjacent the cut-off saw, which is adapted to swing across the front end thereof, and a stop plate 46 is provided on the wall of the chamber, and against which the tubes bottom from the gravity conveyor.

An opening 47 is provided in the wall 12 of the refrigerating chamber, and a door 48 forms a closure for said opening, a guide 49 being formed on the wall adjacent the opening, and into which the cut section 50 rolls, by gravity, as it is cut by the saw. Thence the section rolls through the opening 47, and thence into the trough 51 provided on the outer face of the wall 12.

The opening 47 is normally closed by the insulated door 48 which is hingedly connected at 52, and this door is actuated from the cam member 24 as will be presently described.

A bracket 53 is secured to the face of the wall 12 in any approved manner, and a plunger 54 is slidably mounted therein, a follower 55 being journaled on the end of said plunger for engagement with the cam 24, the opposite end of the plunger engaging a contact face 56 provided on a lever 57.

The lever 57 is formed as clearly shown in Fig. 6 of the drawings, being pivotally mounted on the wall at the point 58, and a link 59 is pivotally connected to the outer end of the member 57 and to the door 48 in any approved manner, a spring (not shown) serving to tension and hold the follower in contact with the face of the cam, so that as the motor is actuated, this mechanism will swing the door to open position, and then back to closed position as indicated in Fig. 7 of the drawings.

The trough member 51 is secured to the outer face of the wall 12 directly adjacent the discharge opening 47, and an extrusion plate 61 is secured to the one end thereof, said plate being provided with an opening 62 through which the frozen ice cream is extruded.

This extruding mechanism is mounted in a bearing 63, and includes a plunger 64 having a head 65 which is of the correct diameter to snugly fit the inside of the package "P," the opposite end of said plunger being pivotally connected to a link 66 which is in turn connected to a crank 67 provided on the end of the shaft 23, so that when the motor "M" is energized, the door 48 will be swung open through instrumentality of the cam 24, and a cut portion 50 of the tube "P" will roll, by gravity, into the trough 51, the plunger 64 actuated by the crank 67 moving outwardly in proper sequence, bringing the head 65 against the cut face of the serving 50, and continued movement forces the ice cream out of the tube section and into a dish "D" which is accommodated in a recessed section 68 of the cabinet, and it is then served by a waitress or attendant as usual.

The end of the bearing 63 is recessed as at 69 to accommodate the head 64, said head closely fitting the interior of the tube, and on the return stroke the one end of the tube bottoms against the member 63. The head is then withdrawn and the emtpy tube section falls free.

Filled tubes are placed in the cabinet through the loading door 17, and these tubes roll, by gravity, to the lower end of the storage racks, the end tube bearing against the stop fingers 70 and 71 provided on the shaft 72.

An offset lug 73 is formed integral with the one finger mechanism 70 and one end of a link 74 is connected thereto, the opposite end being connected to spaced-apart links 75 in which the roller 76 is journaled, this roller riding on the packaged tube of ice cream "P" that is being cut, so that when the end of the tube has advanced on the gravity conveyer beyond the roller 76, said roller will drop down and swing the fingers 70 and 71 downwardly, releasing the next tube, which rolls, by gravity, into the conveyor "G," then sliding endwise down the conveyor and against the stop 46, this travel of the tube again raises the roller 76 to original position and swings the fingers upwardly to form a stop for the remaining reserve tubes on the racks.

The cam 25 actuates the arm 36 which in turn swings the saw through its arc of travel, cutting off a predetermined length of the tube which drops into the discharge opening 47.

A push button 77 is provided on the side wall of the cabinet and is connected to a limit switch 78 provided with a plunger 79 which rides on the cam 80, and the motor is of course connected to any suitable source of power.

Actuation of the push button 77 causes the mechanism to complete a full cycle, so that a single section 50 is cut from tube P at spaced portions 82 thereof (Fig. 11) and the ice cream extruded from the tube section, each time the mechanism is actuated, the magnetic brake serving to accurately control the motor.

When the entire tube "P" has been dispensed, the roll 76 drops down, swinging the stop fingers 70 and 71 to permit the succeeding tube to discharge onto the gravity conveyor, and the machine can then be operated as usual.

This elminates all waste of the ice cream, messy serving tables and counters; it insures the ice cream being of uniform hardness; it eliminates a great deal of unpleasant labor, and large numbers of servings can be dispensed easily and quickly, and in a highly sanitary manner.

At present, it is almost impossible to remove all ice cream from the corners, side walls and bottoms of the containers, and these containers are always messy and unsightly in appearance. Our dispensing mechanism is housed in a cabinet which is an attractive piece of furniture that can be connected to a light socket or other source of power; it is push button operated and requires no dipping scoops, scoopers, or dipping of the scoops in water as at present, and the attendants' uniforms remain fresher and cleaner for longer periods of time.

In Fig. 11 of the drawings, we have shown a carton "P" scored as at 82 at predetermined points intermediate its length, so that they are in direct alignment with the saw and define the individual portions, making it much easier to cut etc.

From the foregoing description, it will be obvious that we have perfected a very simple, practical and attractive ice cream dispensing device which can be readily operated and which is of neat and pleasing appearance.

What we claim is:

1. A dispensing machine of the class described, comprising a cabinet having a refrigerated chamber therein, an inclined storage rack in the chamber, a gravity conveyor adjacent the lower end of the rack, stops on the lower end of said rack, means for actuating said stops to successively feed individual packaged tubes of ice cream to said conveyor, a driven cutting member adjacent the lower end of said gravity conveyor for successively cutting a section of predetermined length from said tube of ice cream, a guide for receiving the cut-off section, a trough adjacent the guide and into which the cut-off section rolls, by gravity, an extrusion plunger in horizontal alignment with said trough, and means for actuating said plunger to move it into alignment with the cut-off section to force the ice cream from the severed section of said tube.

2. The combination as defined in claim 1 in which the extrusion member is located outside the refrigerated chamber, and a normally closed door for permitting passage when opened of the cut section into the trough to bring it into alignment with said extrusion plunger.

3. The combination set forth in claim 1 in which a stop is provided adjacent to and in horizontal alignment with the gravity conveyor.

4. The combination described in claim 1 in which the stops on the lower end of the storage rack comprise spaced-apart, pivotally mounted fingers for holding the tubes of ice cream in position, and means for actuating said stop fingers to permit passage of the lowermost tube on the rack when the individual tube on the gravity conveyor has been completely dispensed.

5. In a dispensing machine of the character described comprising, a cabinet, a refrigerated chamber in the upper end of the cabinet, an inclined storage rack in said chamber and on which individual cylindrical, packaged tubes of ice cream are placed, a gravity conveyor associated therewith, and onto which the individual tubes are successively discharged, a cut-off saw directly adjacent the end of said conveyor, means for driving said saw and swinging it through a predetermined arc of travel to cut a predetermined length from said tube, a door in said chamber, a trough adjacent the door and into which the cut-off section is discharged when the door is opened, means for opening and closing said door, and extrusion means in alignment with said trough for forcing the contents of the severed section of the tube outwardly therefrom.

6. The combination set forth in claim 5 in which the means for driving said saw comprises a motor, and a cam actuated means is drivingly connected to said motor for actuating the door in said chamber.

7. The combination as defined in claim 5 in which a stop is provided on the wall of the chamber in alignment with the gravity conveyor, and against which the packaged tube of ice cream is bottomed prior to the cutting operation.

8. The arrangement described in claim 5 in which stop fingers are provided at the lower end of the storage rack for feeding individual, packaged tubes of ice cream to the conveyor as the stop fingers are actuated, and means in engagement with the individual, packaged tube on the conveyor for actuating said fingers when the entire tube has been dispensed.

9. In an ice cream dispensing device of the character described comprising, a cabinet, a refrigerated chamber provided in the upper end of the cabinet, a gravity conveyor mounted in said chamber, a driven cutting saw directly adjacent the lower end of the gravity conveyor and adapted to be swung transversely of the gravity conveyor and through a definite arc of travel across in front of the lower end of the conveyor in predetermined sequence as the mechanism is driven, gravity means for feeding packaged tubes of ice cream sidewise to said conveyor, and driving means for actuating said feeding means and saw operating means in predetermined sequence.

10. The combination defined in claim 9 in which the ice cream is in a cylindrical tube, an opening in the side walls of the chamber, and a trough member directly below said opening and into which the severed portion of the tube is adapted to roll from said opening when severed by the saw.

11. The combination defined in claim 9 in which the saw severs a predetermined length from the packaged tube of ice cream each time the cutting saw is swung through its arc of travel, and an extrusion plunger operable from said driving means for extruding the ice cream from the severed portions of the tube.

12. The combination set forth in claim 9 in which a trough is provided on the side wall of the refrigerated chamber and into which a cut-off section of the packaged tube of ice cream discharges when severed, an extrusion plate on one end of the trough and provided with a centrally disposed opening therein and a plunger including a head in engagement with the contents of the severed section of the tube of ice cream for extruding it from said severed section as the driving means is operated, and linkage connecting said driving means with said plunger.

13. An ice cream dispensing device of the character described, comprising, a refrigerated chamber, inclined racks mounted therein and serving as a storage space for packaged tubes of ice cream, a gravity conveyor located at the lower end of the racks, a motor mounted in said chamber, a saw driven by the motor, a stop spaced from the end of the conveyor and in alignment therewith, and means connected with the motor for swinging the saw through a predetermined arc of travel for cutting off a section of the packaged tube of ice cream each time the motor is actuated.

14. The combination as defined in claim 13 in which a door is provided directly adjacent the stop, a trough on the outer wall of the refrigerated chamber and into which the cut sections roll when the door is opened, means for opening and closing said door, and means for extruding the ice cream from said cut section.

15. The combination set forth in claim 13 in which a speed reducer is connected to the motor and includes a shaft, an opening in the refrigerated chamber, a door forming a closure for said opening, a trough adjacent the door for receiving the cut-off section of the packaged tube of ice cream each time the saw is swung through its arc of travel, an extruding mechanism mounted on the wall of the chamber, and means on said shaft for opening said last-mentioned door to permit delivery of said cut sections to said trough and removal of the ice cream therefrom by the extruding mechanism.

ARMOND J. MERCIER.
DONALD C. LAWLESS.

REFERENCES CITED

The following references are of record in the file of this patent:

UNITED STATES PATENTS

| Number | Name | Date |
| --- | --- | --- |
| 1,159,688 | Larson | Nov. 9, 1915 |
| 1,347,727 | White | July 27, 1920 |
| 1,848,642 | Micheli | Mar. 8, 1932 |
| 2,148,451 | Elliott | Feb. 28, 1939 |
| 2,154,697 | Phelps | Apr. 18, 1939 |